(12) United States Patent
Gretz

(10) Patent No.: US 6,767,032 B1
(45) Date of Patent: Jul. 27, 2004

(54) LIQUID TIGHT FITTING FOR PLASTIC OR METAL CONDUIT

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

(21) Appl. No.: 10/418,357

(22) Filed: Apr. 18, 2003

Related U.S. Application Data

(63) Continuation-in-part of application No. 10/017,537, filed on Oct. 22, 2001, now Pat. No. 6,616,194.

(51) Int. Cl.[7] ................................................. F16L 3/04
(52) U.S. Cl. ................... 285/151.1; 285/319; 285/249; 285/139.2; 285/207; 285/154.1; 194/65 R
(58) Field of Search ............................. 285/151.1, 319, 285/249, 139.2, 207, 154.1; 174/65 R

(56) References Cited

U.S. PATENT DOCUMENTS

| | | | | |
|---|---|---|---|---|
| 2,821,567 A | | 8/1953 | Bergan | |
| 3,659,880 A | * | 5/1972 | Goldsobel | 285/149.1 |
| 4,133,312 A | | 1/1979 | Burd | |
| 4,169,967 A | * | 10/1979 | Bachle | 174/65 SS |
| 4,188,051 A | * | 2/1980 | Burge | 285/104 |
| 4,224,464 A | * | 9/1980 | Bunnell et al. | 174/65 R |
| 4,225,162 A | * | 9/1980 | Dola | 285/139.1 |
| 4,335,908 A | * | 6/1982 | Burge | 285/250 |
| 4,842,548 A | * | 6/1989 | Bolante | 439/461 |
| 4,900,068 A | | 2/1990 | Law | |
| 5,068,496 A | * | 11/1991 | Favalora | 174/65 R |
| 5,072,072 A | | 12/1991 | Bawa et al. | |
| 5,204,499 A | | 4/1993 | Favalora | |
| 5,593,186 A | * | 1/1997 | Harris | 285/23 |
| 6,044,868 A | * | 4/2000 | Gretz et al. | 138/109 |
| 6,080,933 A | * | 6/2000 | Gretz | 174/65 R |
| 6,133,529 A | * | 10/2000 | Gretz | 174/65 R |
| 6,616,194 B1 | * | 9/2003 | Gretz | 285/151.1 |

* cited by examiner

Primary Examiner—Eric K. Nicholson

(57) ABSTRACT

A liquid tight connector for connecting metallic or non-metallic conduit to a panels or junction box. The connector includes a forward end that accommodates either a spring steel adapter or a lock nut to secure the forward end to a panel in a liquid tight fit. A cover on the rearward end encloses an annular sealing ring and an annular retaining ring to form a conduit accepting channel including a conduit sealing portion and a conduit retaining portion. A conduit is secured to the rearward end of the connector by simply pushing it within the channel and tightening the cover to achieve a liquid tight fit. By eliminating disassembly and reassembly of parts, the connector provides significant labor savings over prior art liquid tight conduit connectors.

13 Claims, 6 Drawing Sheets

LIQUID TIGHT FITTING FOR PLASTIC OR METAL CONDUIT

This application is a Continuation-In-Part of U.S. patent application Ser. No. 10/017,537 entitled "Liquid Tight Connector", filed Oct. 22, 2001, now U.S. Pat. No. 6,616,194.

FIELD OF THE INVENTION

The invention relates to connectors for conduit and specifically to an improved liquid tight connector for joining non-metallic or metallic conduit to junction boxes or panels. Conduit may be secured to the rearward end of the connector without the required tightening of nuts with hand tools as in prior art connectors. The forward end of the connector may be secured by a snap fitting, or, by a lock nut to create a liquid tight fit between the connector and the panel.

BACKGROUND OF THE INVENTION

Many prior art liquid tight connectors are commonly in use for connecting non-metallic or metallic conduit to panels or electrical boxes. These connectors are usually multi-piece devices that must be dismantled to fit the conduit into the fitting and then reassembled to secure the conduit. Most of these prior art fittings require the use of a hand tool to tighten a nut sufficiently to achieve a liquid tight connection between the conduit and the connector. Most prior art liquid tight connectors also require the tightening of a nut on the forward end of the fitting to achieve a liquid tight connection between the fitting and the panel or junction box.

For example, U.S. Pat. No. 4,900,068 to Law, granted Feb. 13, 1990 (hereinafter the '068 patent) claims a liquid tight connector that accepts a non-metallic conduit that is grasped by fingers on a clip grasping on an annular ring on a ferrule. To fit the conduit into the liquid tight connector of the '068 patent, an installer usually must remove a compression on the rearward end of the connector, insert the conduit into the fitting, and then tighten the compression nut with a hand tool such as a wrench to achieve a liquid tight fit. The forward end of the fitting is threaded and must be inserted into the knock-out of a panel or box, a nut is screwed onto the threaded end, and then a hand tool is typically used to secure the fitting to the panel or box. A hand tool therefore is typically employed to achieve a secure liquid tight fit on both the rearward end of the fitting, between the conduit and the fitting, and on the forward end of the fitting, between the fitting and the panel or box.

U.S. Pat. No. 5,072,072 granted to Bawa, et al., on Dec. 10, 1991 (hereinafter the '072 patent) attempts to improve upon the fitting provided in the '068 patent by providing a fitting that requires minimal torque on a gland nut to secure the conduit to the rearward end of the fitting. Upon tightening of the gland nut on the connector body claimed by the '072 patent, the gland nut engages resilient fingers with minimal friction loss, thereby enhancing hand tightening or minimizing the torque required with a tightening tool. The '072 patent therefore requires the separate operation of tightening a nut either by hand or with a tightening tool. The forward end of the fitting in the '072 patent is typically threaded and requires the use of a nut to secure the fitting to the panel and also an O-ring between a forward shoulder and the panel to achieve a liquid tight fit.

U.S. patent application Ser. No. 10/017,537 entitled "Liquid Tight Connector", filed Oct. 22, 2001 by Gretz, now U.S. Pat. No. 6,616,194 and incorporated herein by reference in its entirety, provided a liquid tight connector that solved many of the problems inherent in prior art connectors. The connector of U.S. Pat. No. 6,616,194 provided a one-piece connector assembly, which could be installed to a panel by simply pushing a conduit into a channel on its rearward end and then pushing the forward end into a knockout in a panel or junction box. By providing a connector in which disassembly of parts and tightening of nuts was not required, the connector of the aforementioned application therefore provided a significant labor saving device over prior art liquid tight connectors for conduit. This improved connector included a utinary retainer body to function in cooperation with an integral ferrule on a tubular body member to create a conduit accepting channel on the rearward end of the connector for creating a liquid tight fit between a conduit and the connector.

The present invention improves upon the connector of U.S. Pat. No. 6,616,194 by replacing the unitary retainer body with an annular sealing ring and an annular retainer ring to improve the sealing effectiveness and the liquid tightness between the conduit and the connector.

SUMMARY OF THE INVENTION

The invention is an assembly of parts that is provided as a one-piece connector for achieving a liquid tight seal between a non-metallic or metallic conduit and an electrical panel or box. The connector includes a tubular member with an axial bore there through and a centrally located flange dividing it into two ends including a forward end having threads on its exterior surface and a rearward end having an extending ferrule. A spring steel adapter or a lock nut may be used to connect the forward end to a panel in a liquid tight fit. The rearward end accommodates an annular sealing ring and an annular retaining ring held within an annular cover member. A conduit accepting channel is thereby formed within the rearward end. A conduit may be secured to the rearward end of the connector by simply pushing it within the channel and tightening the cover to achieve a liquid tight fit. The connector provides significant labor savings over prior art liquid tight conduit connectors as disassembly of parts prior to insertion of the conduit is eliminated.

TABLE OF NOMENCLATURE

Figure 2:
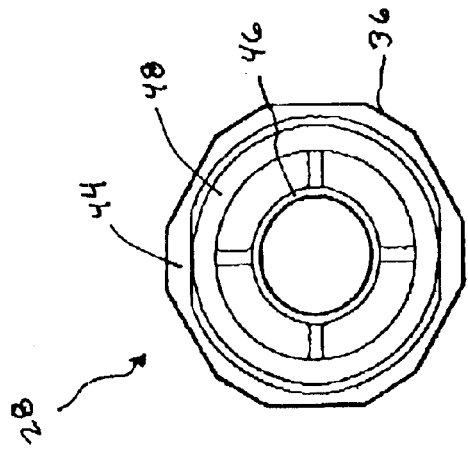
FIG. 2 is an end view of the ferrule bushing as viewed from the right side of FIG. 1

| Part No. | Part Description |
|---|---|
| 20 | liquid tight connector |
| 22 | snap ring |
| 24 | sealing washer |
| 28 | tubular body |
| 30 | sealing ring |
| 32 | retaining ring |
| 34 | cover member |
| 36 | flange |
| 38 | forward end of tubular body |
| 40 | rearward end of tubluar body |
| 42 | forward face of flange |
| 44 | rearward face of flange |
| 46 | ferrule |
| 48 | shoulder |
| 50 | outer periphery of shoulder |
| 52 | threads on shoulder |
| 54 | nose portion of tubular body |
| 56 | threads on nose portion |
| 58 | hex surface |
| 60 | forward end of cover |
| 62 | rearward end of cover |
| 64 | forward end of retaining ring |
| 66 | rearward end of retaining ring |
| 68 | U-shaped cuts |
| 70 | outer periphery of retaining ring |
| 72 | conduit retaining tangs |
| 74 | central bore through retaining ring |
| 76 | wall of retaining ring |
| 78 | integral outer tabs |
| 80 | free ends |
| 82 | inner periphery of sealing ring |
| 84 | first outer edge of sealing ring |
| 86 | second outer edge of sealing ring |
| 88 | center of inner periphery of sealing ring |
| 90 | outward tangs on snap ring |
| 92 | inwardly turned edge of snap ring |
| 94 | threads on cover member |
| 96 | lip on cover |
| 98 | face of the shoulder |
| 100 | conduit accepting channel |
| 102 | forward portion of accepting channel |
| 104 | rearward portion of accepting channel |
| 106 | rearward end of connector |
| 108 | conduit |
| 110 | junction box |
| 112 | aperture |
| 114 | forward fastening arrangement |
| 116 | forward end of connector |
| 118 | lock nut |
| 120 | wall of junction box |

DESCRIPTION OF THE INVENTION

According to the present invention, the present invention is a liquid tight connector for securing a conduit to a panel. Referring to the exploded view of the liquid tight connector 20 in FIG. 12, the preferred embodiment includes, from left to right, a snap ring 22, sealing washer 24, tubular body 28, sealing ring 30, retaining ring 32, and cover member 34.

Figure 1:
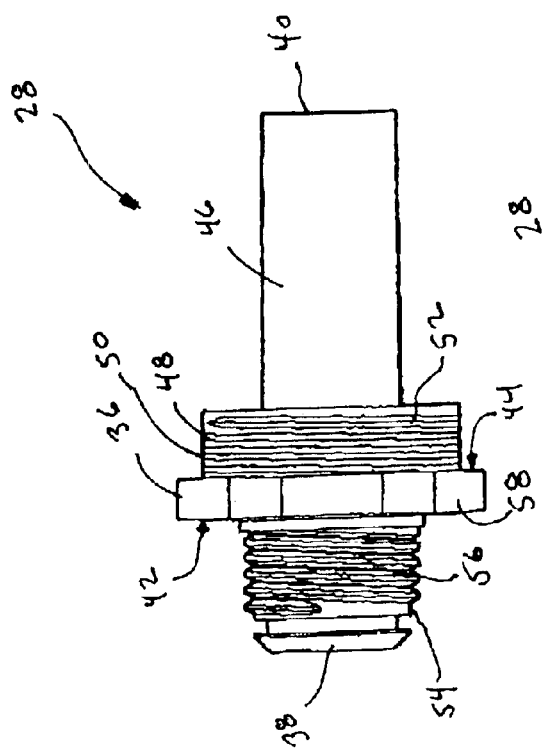
FIG. 1 is a plan view of the tubular body portion of the liquid tight connector of the present invention.

With reference to FIG. 1, a flange 36 divides the tubular body 28 into a forward end 38 and a rearward end 40. The ends of the tubular body 28 are referred to herein according to the direction they will face when used in conjunction with a box or panel (not shown), with the forward end 38 facing the panel and the rearward end 40 facing away from the panel. The flange 36 includes a forward face 42 and a rearward 44 face. The rearward end 40 includes an integral ferrule 46 that extends from the rearward face 44 of the flange 36. Also extending from the rearward face 44 is an integral shoulder 48 outwards of and concentric to the ferrule 46. The outer periphery 50 of the shoulder 48 includes threads 52. The forward end 38 of the tubular body 28 includes an integral tubular nose portion 54 extending from the forward face 42 of the flange 36 and including threads 56 on its outer periphery. In the preferred embodiment, the exterior periphery of the flange includes a hex surface 58.

Referring now to FIG. 2, an end view of the tubular body 28 is depicted as viewed from the right side of FIG. 1. The ferrule 46 is shown extending from the rearward face 44 of the flange 36. Outwards of and concentric to the ferrule 46 is the shoulder 48 extending from the rearward face 44 of the flange.

Figure 3:
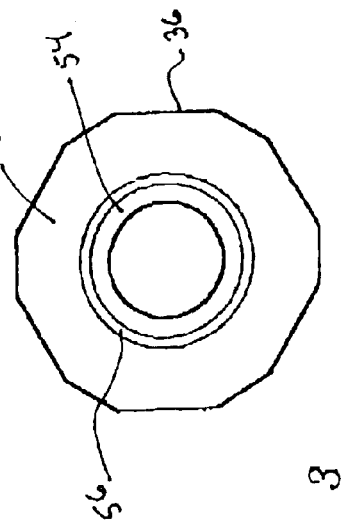
FIG. 3 is an end view of the ferrule bushing as viewed from the left side of FIG. 1.

As depicted in FIG. 3, an end view of the tubular body 28 as viewed from the left side of FIG. 1, the nose portion 54 of the tubular body 28 extends from the forward face 42 of the flange 36 and includes threads 56 on its outer periphery.

Figure 4:
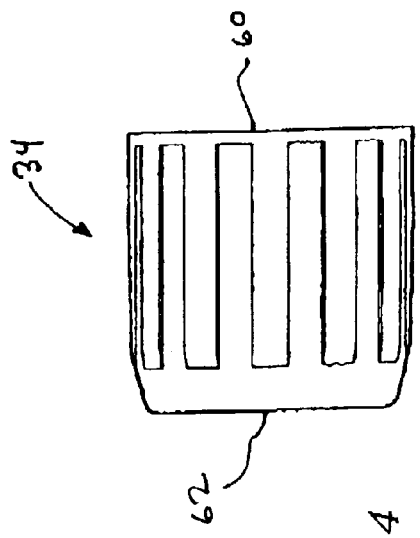
FIG. 4 is a plan view of the retainer body cover portion of the liquid tight connector.

Referring to FIG. 4, the cover member 34 includes a forward end 60 that will face the tubular body when the liquid tight connector is assembled and a rearward end 62 that will face away from the tubular body.

Figure 5:
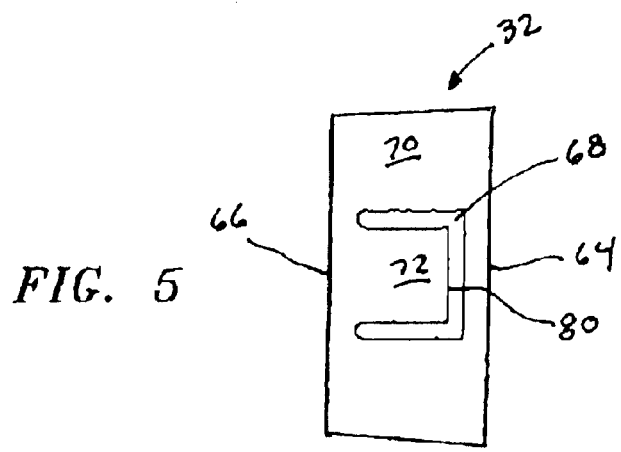
FIG. 5 is a plan view of an annular retainer ring that forms part of the liquid tight connector of the present invention.
Figure 6:
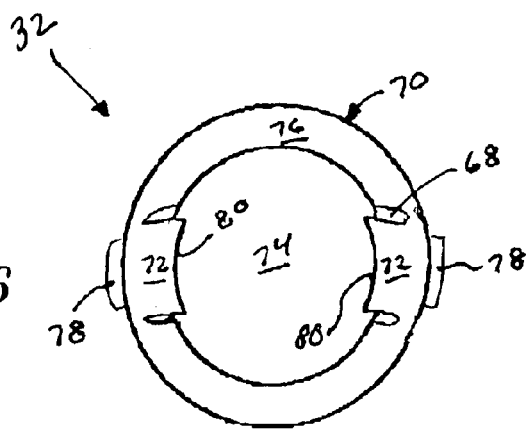
FIG. 6 is an end view of the retainer ring as viewed from the left side of FIG. 5.

Referring to FIGS. 5 and 6, the tubular retaining ring 32 includes a forward end 64 that will face the tubular body (not shown) and a rearward end 66. U-shaped cuts 68 on the outer periphery 70 of the retaining ring 32 define conduit retaining tangs 72 that extend into the axial bore 74 through the retaining ring 32. The conduit retaining tangs 72 extend into the central bore 74 of the retaining ring 32 from the U-shaped cuts 68 in the wall 76 of the retaining ring 32. The conduit retaining tangs 72 include integral outward tabs 78 extending outwards of the outer periphery 70 of the retaining ring 32 and free ends 80 extending into the central bore 74.

Figure 7:
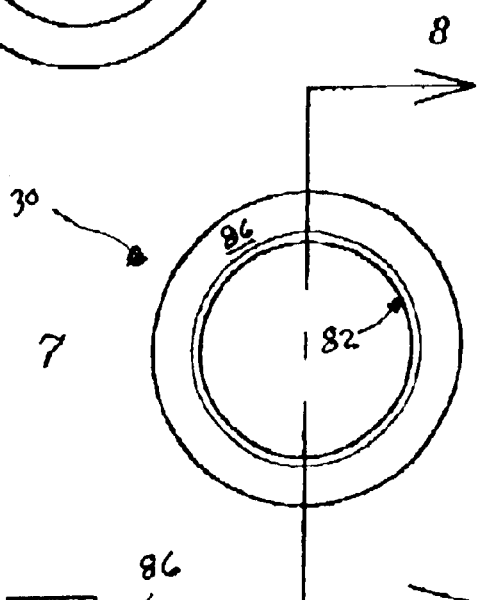
FIG. 7 is a plan view of an annular sealing ring that forms part of the liquid tight connector of the present invention.
Figure 8:
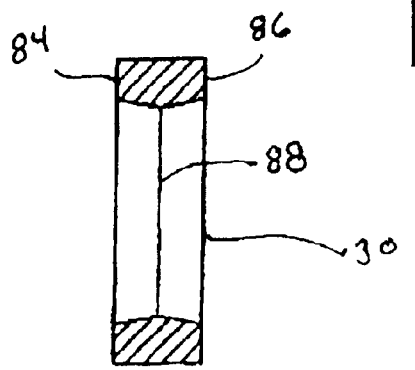
FIG. 8 is a sectional view of the sealing ring taken along line 8—8 of FIG. 7.

With reference now to FIGS. 7 and 8, the sealing ring 30 of the preferred embodiment includes an inner periphery 82 having outer edges 84 and 86 and a center 88. The preferred embodiment of the sealing ring is constructed of an elastomeric material and is tapered as shown in FIG. 8 from a wider diameter at the outer edges 84, 86 to a narrower diameter at the center 88.

Figure 9:
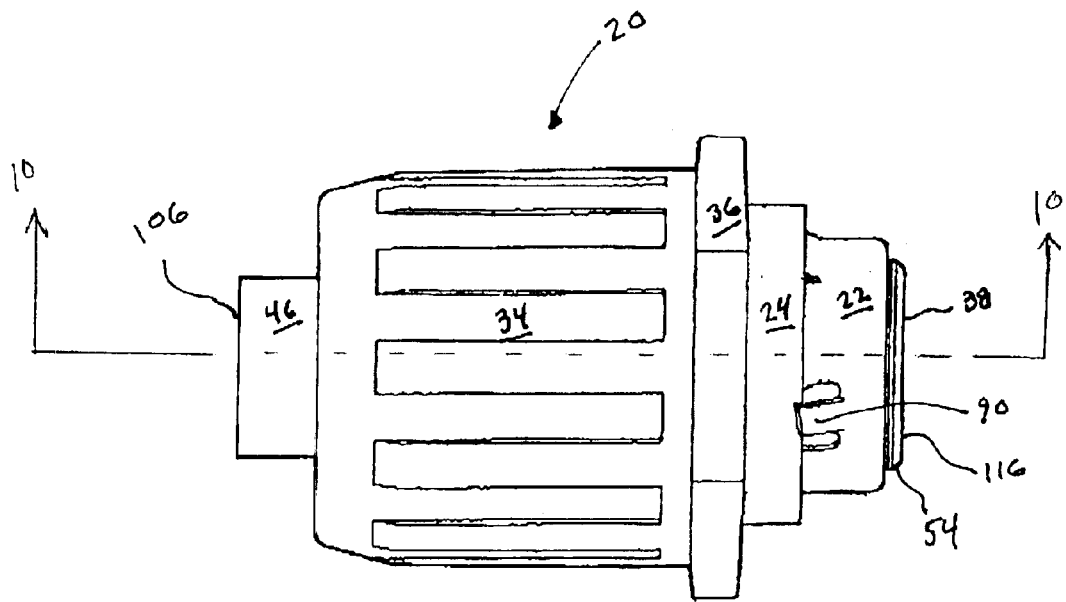
FIG. 9 is a plan view of a preferred embodiment of the liquid tight connector of the present invention.
Figure 10:
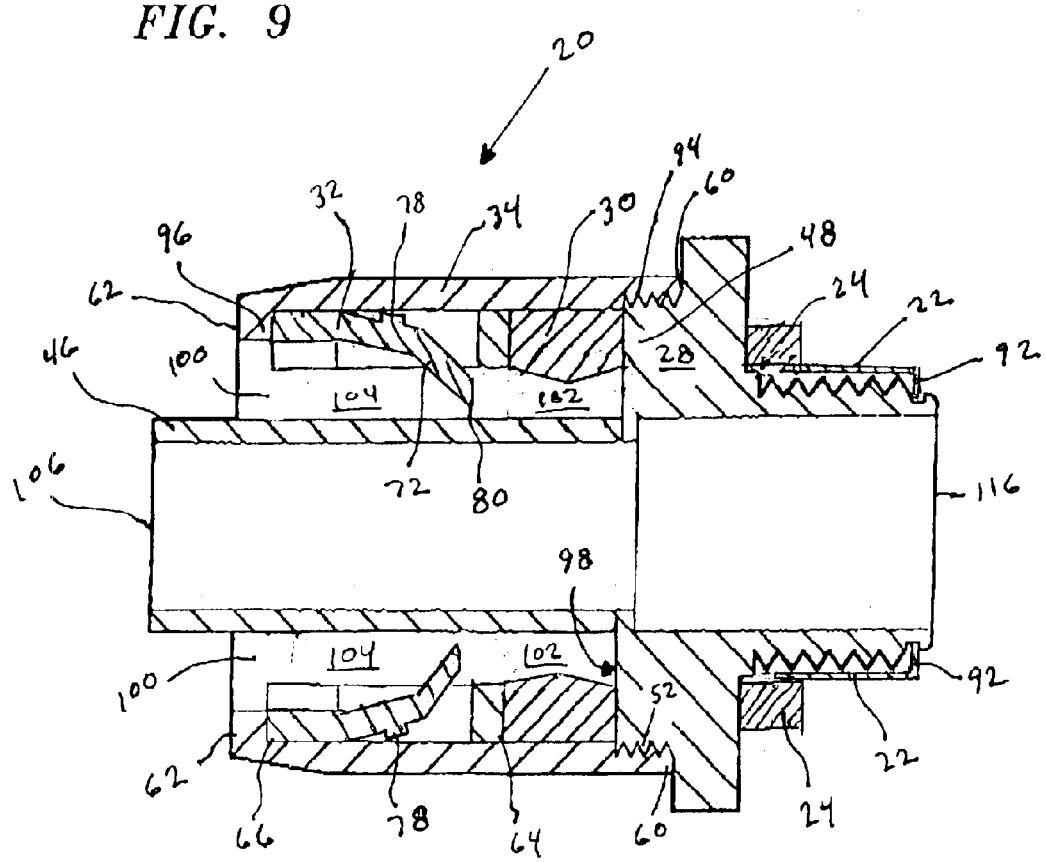
FIG. 10 is a sectional view of the liquid tight connector taken along line 10—10 of FIG. 9.

With reference now to FIGS. 9 and 10, the preferred embodiment of the liquid tight connector 20 includes a snap ring 22 fitted on the nose portion 54 on the forward end 38 of the tubular body 28. Outward tangs 90 on the snap ring 22 restrain the sealing washer 24 on the nose portion 54. The snap ring 22 may be held on the nose portion 54 by an inwardly turned forward edge 92 as shown in FIG. 10. Further details of the snap ring 22 may be found in U.S. Pat. No. 6,080,933, issued Jun. 27, 2000 in the name of Thomas J. Gretz for "Snap in Cable Connector", and herein incorporated by reference in its entirety. The ferrule 46 is shown extending out of the rearward end 62 of the cover member 34.

Referring to FIG. 10, the preferred embodiment of the liquid tight connector is assembled by sliding first the sealing ring 30 and then the retaining ring 32 over the ferrule 46, and then screwing the cover member 34 onto the tubular body 28. The forward end 60 of the cover 34 contains threads 94 that engage the threads 52 on the shoulder 48 of the tubular body 28. The sealing ring 30 and retaining ring 32 are thus held within the cover member 34 as shown. An inward-turned lip 96 on the rearward end 62 of the cover urges the retaining ring 32 against the sealing ring 30 until the forward end of the sealing ring is flush against the face 98 of the shoulder 48. Once the cover 34 is tightened on the shoulder 48, the retaining ring 32 and sealing ring 30 are held concentrically around the ferrule 46 thereby creating a conduit accepting channel 100 there between. The conduit accepting channel 100 includes a forward portion 102 between the ferrule 46 and the sealing ring 30 and a rearward portion 104 between the ferrule 46 and the retaining ring 32. The conduit retaining tangs 72 include free ends 80 that extend inwardly and forwardly from the retaining ring 32 into the forward portion 102 of the channel 100. The channel 100 is open at the rearward end 106 of the connector 20 and is typically sized to accept a standard grade of conduit (not shown).

Figure 11:
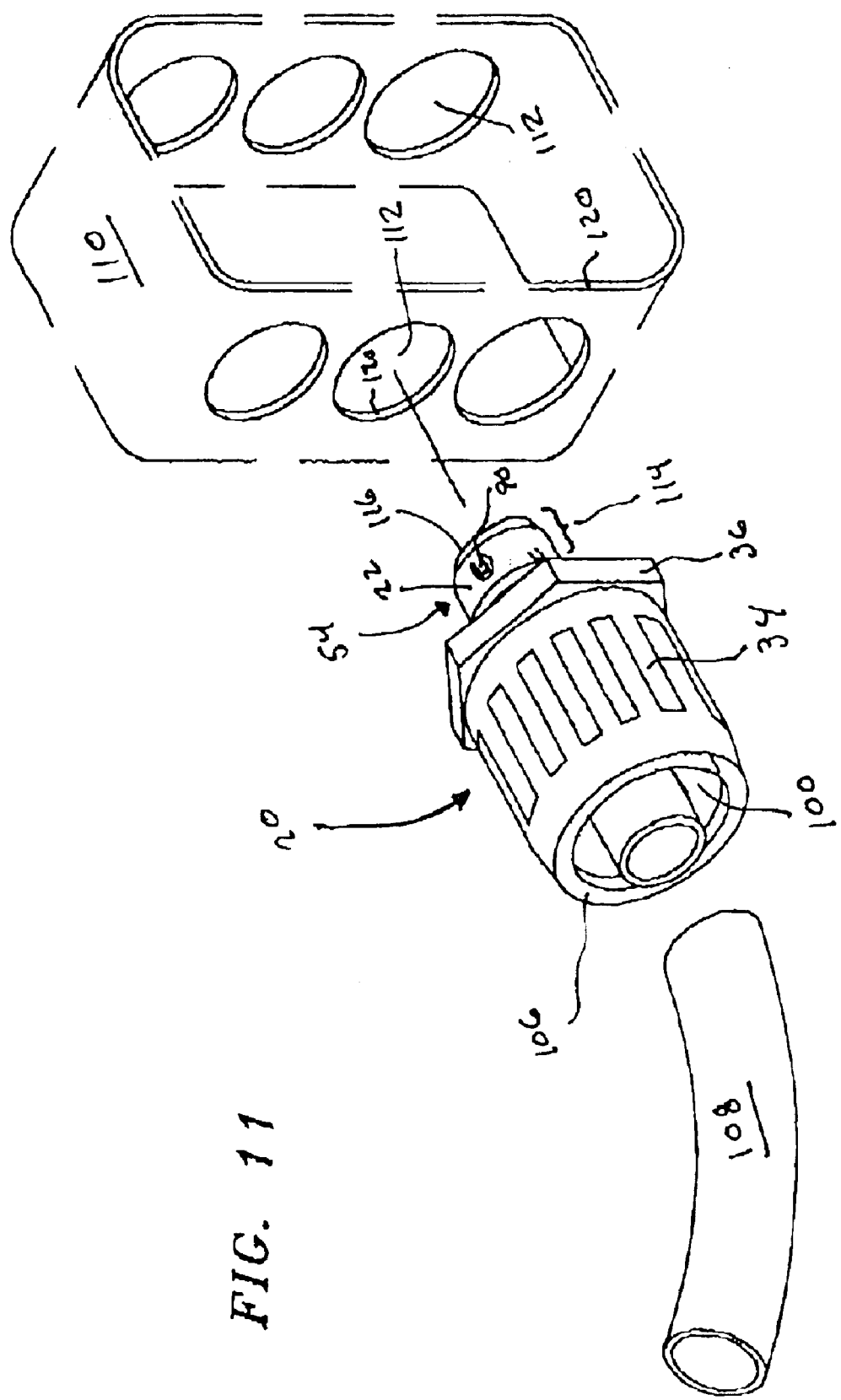
FIG. 11 is a perspective view showing a section of conduit, the preferred embodiment of the liquid tight connector, and a junction box to which the connector will be fitted.

Referring to FIG. 11, the open end of the conduit accepting channel 100 is visible in this perspective view showing a section of conduit 108, the preferred embodiment of the liquid tight connector 20, and a junction box 110 containing several apertures 112 therein.

Figure 12:
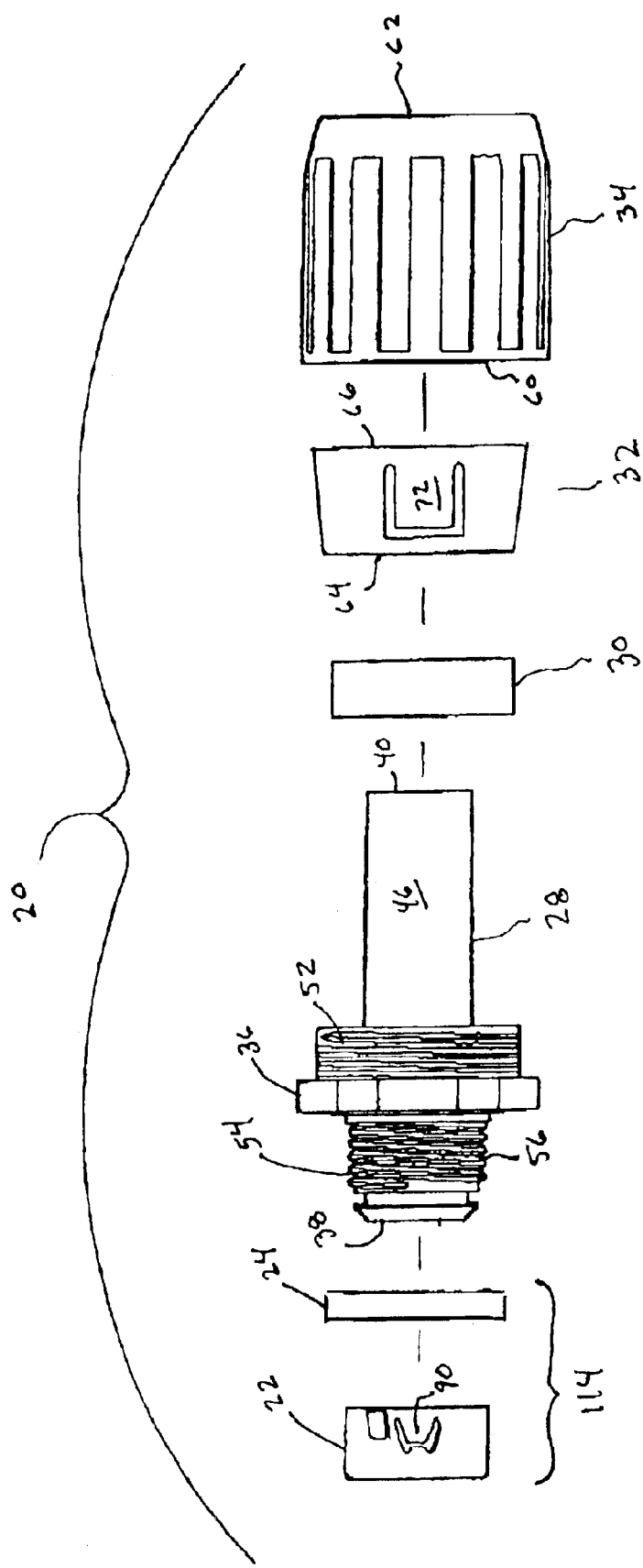
FIG. 12 is an exploded view of the preferred embodiment depicting, from left to right, a snap ring, sealing washer, tubular body, sealing ring, retaining ring and cover member.
Figure 13:
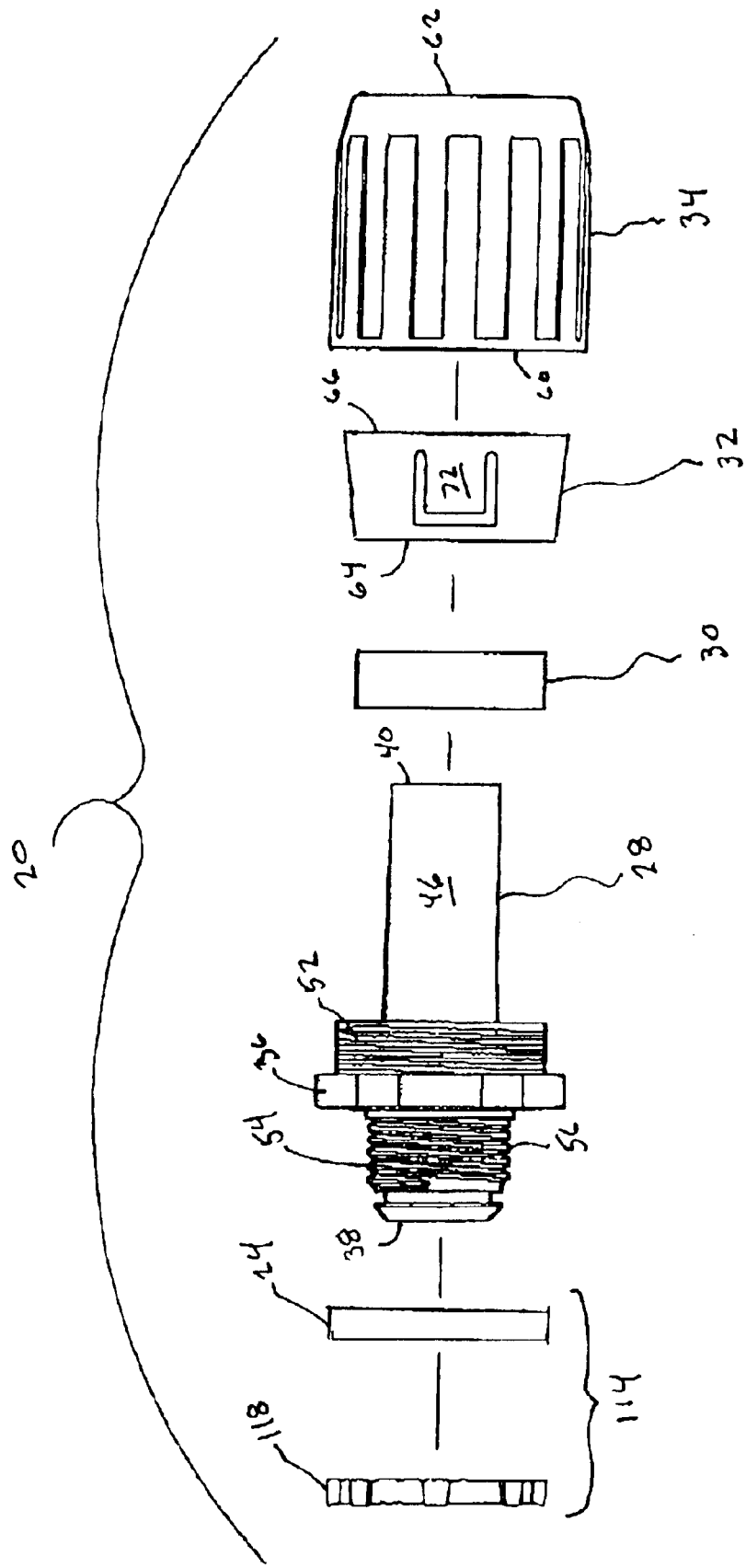
FIG. 13 is an exploded view of a second embodiment of the liquid tight connector depicting, from left to right, a lock nut, sealing washer, tubular body, sealing ring, retaining ring and cover member.

With reference to FIGS. 11–13, the liquid tight connector 20 includes a forward fastening arrangement 114 for securing the forward end 116 of the connector 20 to a junction box 110. The forward fastening arrangement 114 could be a snap ring 22 and sealing washer 24 as shown in the preferred embodiment of FIG. 12, or a lock nut 118 and sealing washer 24 as shown in the second embodiment in FIG. 13. When the forward fastening arrangement 114 is a snap ring 22 and sealing washer 24, the forward end 116 is simply pushed into an appropriate aperture 112 until the outward tangs 90 pass the wall of the junction box and snap outwards thereby locking the nose portion 54 of the connector 20 into the aperture 112. When the forward fastening arrangement 114 is a lock nut 118 and sealing washer 24, the nose portion 54 of the connector 20 is simply inserted in an aperture 112 and the lock nut 118 screwed onto the threaded nose portion 54 until tight against the inside wall of the junction box 110, thereby locking the nose portion 54 of the connector 20 into the aperture 112.

Operation of the liquid tight connector may best be explained by reference to the preferred embodiment shown in FIGS. 10 and 11. The liquid tight connector 20 is connected to a panel or junction box 110 by simply grasping the conduit 108, inserting it into the conduit accepting channel 100 on the rearward end 106 of the connector 20, and pushing the conduit 108 into the channel 100 until the end of the conduit is pushed fully into the channel 100. After the conduit 108 is secured to the connector 20, the forward end 116 of the connector 20 is pushed into the knockout aperture 112 of a junction box 110 until the outward tangs 90 clear the wall 120 of the junction box 110. The snap ring 22 is constructed of a resilient material such as spring steel and the outward tangs 90 are oriented, in their unbiased position, outward and rearwards on the snap ring 22. As the outward tangs 90 enter the knockout aperture 112 they are compressed inwardly. Further advancement of the snap ring 22 into the knockout aperture 112 eventually causes the outward tangs 90 to clear the wall 120 of the junction box 110 at which point the outward tangs 90 snap back to their unbiased position thereby locking the connector 20 securely to the junction box 110.

Alternatively, to allow easier insertion of the conduit 108, the cover 34 may be screwed partially onto the shoulder 48 and the conduit inserted therein. The inner diameter of the cover member is typically slightly tapered from a wider diameter at the forward end 60 of the cover to a narrower diameter at the rearward end 62 of the cover 34. The interior walls of the cover 34 preferably are tapered downward at an angle of 2 degrees from the forward end 60 to the rearward end 62, therefore sloping the inner bore of the cover at an angle of 2 degrees from front to rear. With the cover 34 screwed partially onto the shoulder 48, the retaining ring 32 is not forced fully against the lip 96, as the effective outer diameter of the retaining ring 32 at the integral outward tabs 78 is larger than the inner diameter of the cover 34 at the rearward end 62. Therefore the free ends 80 of the conduit retaining tangs 72 are not extended fully into the channel 100. A conduit 108 can then be inserted into the channel 100 and encounter minimal resistance. After insertion of the conduit 108, the cover member 34 is screwed fully onto the shoulder 48 thereby forcing the retaining ring 32 further against the sealing ring 30 and towards the face 98 of the shoulder 48. This in turn causes the narrower diameter at the rearward end 62 of the cover to depress the tabs 78 and force the conduit retaining tangs 72 further into the channel, as depicted in FIG. 10 with the cover 34 fully screwed onto the shoulder 48.

Referring to FIG. 10, for a liquid tight connector 20 having the interior walls of the cover 34 tapered downward at the preferred angle of 2 degrees from the forward end 60 to the rearward end 62, the interior diameter of the cover 34 at the forward end 60 is typically 1.180 inches and the interior diameter of the cover 34 at the rearward end 62 is typically 1.130 inches. The exterior walls of the retaining ring 32 are also preferably tapered downward at an angle of 2 degrees from its forward end 64 to its rearward end 66. The exterior diameter of the retaining ring 32 at the forward end 64 is typically 1.150 inches and the interior diameter of the retaining ring 32 at the rearward end 66 is typically 1.125 inches. The exterior diameter of the retaining ring 32 across the integral outward tabs 78 is preferably 1.160 inches. As a result of the interior 2 degree taper on the cover member 34 and the exterior 2 degree taper on the retaining ring 32, tightening of the cover 34 on the connector 20 will gradually depress the tabs 78 as the cover is tightened on the shoulder 48. Full tightening of the cover 34 upon the connector 20 will force each of the tabs 78 to be depressed approximately 0.010 to 0.015 inches, thereby causing the tabs 78 to tightly grip the conduit surface (not shown).

Conduit is offered in various trades sizes, such as ¼", ½", ¾", etc. Underwriters' Labs has created standards for these trade sizes including specifications for the outer and inner diameters of the various trade sizes. Therefore, the preferred embodiment of the liquid tight connector 20 of the present disclosure can be constructed for any trade size of conduit by sizing the conduit accepting channel 100, as shown in FIG. 8, to handle the desired trade size conduit. The liquid tight connector can therefore be constructed for ¼", ½", ¾", or any other trade size conduit. The nose portion 54, snap ring 22, and sealing washer 24 can likewise be constructed of an appropriate size to enable rapid snap-in connection of the forward end 116 of the connector 20 to any trade size of knockout aperture 112.

Referring again to FIG. 12, the pieces of the connector assembly 20 are, from left to right, the snap ring 22, the sealing washer 24, the tubular body 28, the sealing ring 30, the retaining ring 32, and the cover member 34. The snap ring 22 is preferably constructed of spring steel. The sealing washer 24 is preferably constructed of Santoprene™, which is a trademark of Advanced Elastomer Systems, L.P., but may be constructed of any similar elastomer. Additionally, it may be preferable to construct the sealing washer 24 of a flame retardant grade of thermoplastic elastomer to meet Underwriters Laboratories flame retardant requirements, such as grades UL 94 V-0 or UL 94 HB. The ferrule bushing is preferably constructed of a zinc alloy, such as Zarnak™ 7. Constructing the tubular body 28 of zinc alloy and the snap ring 22 of spring steel enables the connector 20 to establish electrical continuity between the metallic conduit and a metal panel. The retaining ring 32 and the cover member 34 are preferably molded of plastic. The preferred material of construction for the retaining ring 32 is polycarbonate and the preferred material of construction for the cover member 34 is nylon.

Although the description above contains many specific descriptions and proposed sizes, these should not be construed as limiting the scope of the invention but as merely providing illustrations of a preferred embodiment of the liquid tight connector of this disclosure. Typical sizes are provided to illustrate a given embodiment of the present invention and should not be construed as limiting its scope.

Thus the scope of the invention should be determined by the appended claims and their legal equivalents, rather than by the specific examples given.

What is claimed is:

1. A liquid tight connector comprising:
    a tubular body including a central flange having a forward and a rearward face;
    a ferrule extending from said rearward face;
    an annular sealing ring adjacent said rearward face, said sealing ring coaxial with said ferrule;
    an annular retaining ring adjacent said sealing ring, said retaining ring coaxial with said ferrule, said retaining ring having an outer periphery;
    an annular cover member retaining said sealing ring and said retaining ring against said rearward face;
    a conduit accepting channel, said channel including a forward portion between said sealing ring and said ferrule, said channel including a rearward portion between said retaining ring and said ferrule;
    a fastening arrangement for securing said cover to said tubular body;
    a tubular nose portion extending from said forward face;
    a sealing washer disposed on said nose portion adjacent said forward face;
    a forward fastening arrangement for securing said tubular nose portion to a panel;
    said annular retaining ring includes one or more conduit retaining tangs extending inwardly and forwardly into said forward portion of said channel and terminating in free ends;
    said conduit retaining tangs include integral outward tabs; and
    said tabs extending to a greater diameter than said outer periphery of said annular retaining ring.

2. The liquid tight connector of claim 1 wherein said cover member includes
    an inner bore having a forward portion and a rearward portion;
    said forward portion of said inner bore of a greater diameter than said rearward portion of said inner bore.

3. The liquid tight connector of claim 2 wherein said fastening arrangement includes
    threads on said inner periphery of said forward portion of said cover;
    a shoulder extending from said rearward face of said tubular body, said shoulder having an outer periphery; and
    threads on said outer periphery of said shoulder; enabling said cover to be threaded onto said shoulder.

4. The liquid tight connector of claim 3 wherein said outer periphery of said retaining ring is substantially the same diameter as said rearward portion of said inner bore of said cover, such that insertion of a conduit into said conduit accepting channel and fastening of said cover member onto said tubular body causes said rearward portion of said inner bore of said cover to compress said tabs thereby forcing said free ends of said conduit retaining tangs into the surface of said conduit.

5. The liquid tight connector of claim 4 wherein said sealing ring is formed of an elastomeric material.

6. The liquid tight connector of claim 5 wherein said sealing ring includes an inner bore that is smaller than the outer periphery of a conduit that it will be used in conjunction with.

7. The liquid tight connector of claim 6 wherein insertion of a conduit into said conduit accepting channel and fastening of said cover member onto said tubular body compresses the inner periphery of said sealing ring against said outer periphery of said conduit thereby creating a water-tight seal.

8. The liquid tight connector of claim 7 wherein
    said inner periphery of said sealing ring includes outer edges and a center; and
    said inner bore of said sealing ring tapers from a wider bore at said outer edges to a narrower bore at said center.

9. The liquid tight connector of claim 2 wherein said inner bore of said cover tapers downward at an angle of 2 degrees from said forward portion of said inner bore to said rearward portion of said inner bore.

10. The liquid tight connector of claim 4 wherein said retaining ring has a forward end and a rearward end and said outer periphery of said retaining ring tapers downward at an angle of 2 degrees from said forward end of said retaining ring to said rearward end of said retaining ring, such that insertion of a conduit into said conduit accepting channel and fastening of said cover member onto said tubular body causes said rearward portion of said inner bore of said cover to compress said tabs thereby forcing said free ends of said conduit retaining tangs into the surface of said conduit.

11. The liquid tight connector of claim 1 wherein said forward fastening arrangement includes
    an annular non-continuous snap ring secured to said nose portion, said snap ring of a diameter slightly larger than an aperture in a panel that it will be used in conjunction with; and
    outward-directed tangs projecting from the outer periphery of said snap ring; wherein advancement of said nose portion into said aperture causes said tangs to compress and snap outwards as said tangs clear said panel, thereby locking said forward end in said panel.

12. The liquid tight connector of claim 1 wherein said forward fastening arrangement includes threads on said tubular nose portion and a lock nut.

13. The liquid tight connector of claim 11 wherein said snap ring is constructed of spring steel.

* * * * *